United States Patent

Yoshiyama et al.

[15] 3,674,928

[45] July 4, 1972

[54] SCANNING APPARATUS FOR ELECTROLUMINESCENT CROSSED-GRID PANEL

[72] Inventors: Masami Yoshiyama; Teruo Sato; Hitoshi Takeda, all of Osaka, Japan

[73] Assignee: Matsushita Electric Industrial Co., Ltd., Osaka, Japan

[22] Filed: March 10, 1970

[21] Appl. No.: 18,067

[30] Foreign Application Priority Data

March 14, 1969 Japan....................................44/21067
March 14, 1969 Japan....................................44/21068
March 14, 1968 Japan....................................44/21069

[52] U.S. Cl. ....................................178/7.3 D, 315/169 TV
[51] Int. Cl. ..........................................................H04n 5/70
[58] Field of Search .......................178/7.3 D, 7.5 D, 5.4 EL; 315/169 R, 169 TV; 313/108 B; 340/166 EL

[56] References Cited

UNITED STATES PATENTS 3,343,128 9/1967 Rogers ..............................313/108 B
3,021,387 2/1962 Rajchman ..........................313/108 B

FOREIGN PATENTS OR APPLICATIONS 1,537,252 10/1969 Germany ...........................178/7.3 D

*Primary Examiner*—Robert L. Griffin
*Assistant Examiner*—George G. Stellar
*Attorney*—Wenderoth, Lind & Ponack

[57] ABSTRACT

A scanning apparatus for an electroluminescent crossed-grid panel having a multiplicity of electroluminescent elements at the intersections of horizontal and vertical electrodes. The scanning apparatus has a horizontal electrode driving circuit adapted to be coupled to said horizontal electrodes and having a set of pulse generators for supplying a selecting pulse to a horizontal electrode to be scanned sequentially in response to a synchronizing signal of a video signal and for supplying the remaining horizontal electrodes at the same time with blanking pulses which are in phase with said selecting pulse and have an amplitude less than one-half of said selecting pulse. A video signal supply means is coupled to said horizontal electrode driving circuit for supplying the synchronizing signal of the video signal. A vertical electrode driving circuit is provided which has a set of brightness control circuits, each of which includes a transistor having the collector thereof adapted to be connected to a corresponding vertical electrode. A circuit for supplying a multi-channel video signal is connected to the base of each said transistor, and a delay means is provided having a delay time corresponding to one horizontal period of the video signal and has taps connected to associated brightness control circuits. A sample reset signal generator is coupled to said brightness control circuits and to said video signal supply means for supplying a sample signal and a reset signal to said brightness control circuits in response to synchronizing signals of a video signal. The video signal supply means is coupled to said vertical electrode driving circuit for supplying an amplified video signal to the input terminal of said delay means. By means of this apparatus each of said electroluminescent elements along the horizontal electrode to be scanned is simultaneously controlled with respect to the brightness thereof by varying the collector resistance of each of said transistors in response to the multi-channel video signals which are sampled at each tap of said delay means at the same time.

3 Claims, 6 Drawing Figures

INVENTORS
MASAMI YOSHIYAMA
TERUO SATO
HITOSHI TAKEDA

BY Wenderoth, Lind & Ponack
ATTORNEYS

INVENTORS
MASAMI YOSHIYAMA
TERUO SATO
HITOSHI TAKEDA

BY Wenderoth, Lind & Ponack
ATTORNEYS

SCANNING APPARATUS FOR ELECTROLUMINESCENT CROSSED-GRID PANEL

FIELD OF THE INVENTION

This invention relates to a scanning apparatus for a solid state display device, and more particularly to a scanning apparatus for an electroluminescent display comprised of an electroluminescent crossed-grid panel which can reproduce a static or moving picture in half-tone, such as a television image, from an image information signal in real time.

DESCRIPTION OF THE PRIOR ART

Since the time when the existence of the electroluminescent phenomenon suggested the possibility of a flat-panel type solid state display device, many devices have been proposed in the field of electroluminescent display devices. Among them, the display devices using an electroluminescent crossed-grid panel have been considered to have high potential for practical use.

A well-known electroluminescent crossed-grid panel consists essentially of an electroluminescent phosphor layer and two sets of spaced parallel conductors at least one set of conductors being transparent. The first set of conductors is positioned on one surface of the electroluminescent layer at right angles to the second set of conductors which is positioned on the other surface of the electroluminescent phosphor layer. The conductors are referred to as the horizontal (Y) and vertical (X) electrodes. When an alternating or pulsed voltage is applied across a pair of horizontal and vertical electrodes, the portion of the electroluminescent layer located at the intersection of said electrodes, defined as an electroluminescent element or cell, is made luminescent, its brightness depending upon the amplitude, frequency and waveform of the applied voltage.

In order to reproduce an image on the electroluminescent crossed-grid panel from an image information signal such as a television signal, scanning is necessary. A well-known scanning technique for the crossed-grid display is carried out by selecting horizontal and vertical electrodes in a predetermined sequence and by applying proper voltage corresponding to the image information signals.

Undesired luminosity is, however, generated from the electroluminescent elements along the selected electrodes, this luminosity being the result of capacitive coupling among electroluminescent elements. This phenomenon, called the cross effect, reduces the contrast between the image and the background. An important technical problem in the scanning of the electroluminescent crossed-grid panel is how to prevent the cross effect as well as how to control the brightness of the electroluminescent element in response to the image information signal.

When a television signal is used as the image information signal, three basic requirements must be satisfied by the scanning apparatus. The first is the ability to scan a large number of electroluminescent elements — more than 150,000 if the full information of in the broadcast television signal is utilized. The second is the ability to scan at high speed corresponding to the television signal. The third is the ability to reproduce faithfully pictures in half-tone.

There have been disclosed some devices and apparatus for the scanning of an electroluminescent crossed-grid panel, but these do not seem to satisfy these requirements.

SUMMARY OF THE INVENTION

It is therefore an object of the invention to provide an improved scanning apparatus for an electroluminescent crossed-grid panel capable of satisfactorily producing a moving picture in half-tone at high speed, such as a television image.

It is another object of the present invention to provide an improved scanning apparatus in which the cross effect is reduced by applying blanking pulses to unscanned horizontal electrodes and the brightness of electroluminescent elements is controlled sequentially line-by-line by varying the collector resistance of the transistors.

The present scanning apparatus is based on a scanning method of the cross-grid or X—Y matrix control type, and is characterized by a combination of line-by-line scanning by the use of a tapped delay line, suppression of the cross effect by blanking pulses, and brightness control by pulse amplitude modulation.

A scanning apparatus for electroluminescent crossed-grid panel according to the present invention comprises (1) a horizontal electrode driving circuit having a set of pulse generators for supplying a selecting pulse and blanking pulses in response to a horizontal synchronizing signal, (2) a vertical electrode driving circuit consisting essentially of a delay means and a set of brightness control circuits, (3) a sample-reset signal generator, and (4) a video signal supply means.

Each of the electroluminescent elements along the horizontal electrode to be scanned is controlled with respect to its brightness simultaneously by varying the collector resistance of each of the transistors in said brightness control circuits in response to multi-channel video signals.

BRIEF DESCRIPTION OF THE FIGURES

More details of the present scanning apparatus and its features will become apparent upon consideration of the following description taken together with the accompanying drawings, in which.

DESCRIPTION OF PREFERED EMBODIMENT

Figure 1:
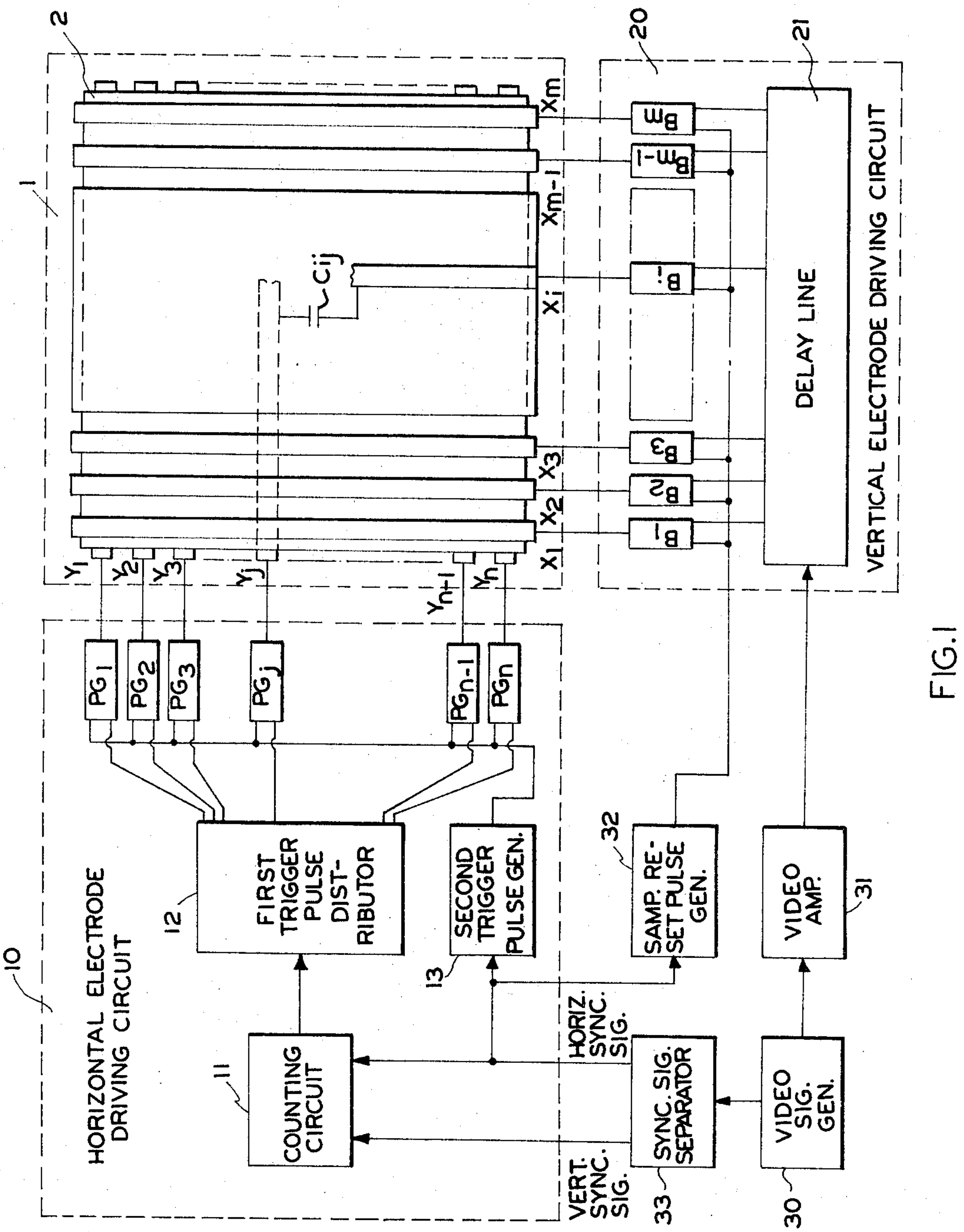
FIG. 1 is a block diagram of the present scanning apparatus for an electroluminescent crossed-grid panel.

Referring to FIG. 1, an embodiment of the present scanning apparatus for an electroluminescent crossed-grid panel comprises a horizontal electrode driving circuit 10, a vertical electrode driving circuit 20, a video signal generator 30, a video amplifier 31, a sample-reset pulse generator 32, and a synchronizing signal separator 33.

The electroluminescent cross-grid panel 1, shown in FIG. 1, has three essential elements, an electroluminescent phosphor layer 2, horizontal electrodes $Y_1$, $Y_2$, $Y_3$, . . . $Y_j$, . . . $Y_n$, and vertical electrodes $X_1$, $Y_2$, $X_3$, . . . $X_i$, . . . $X_m$. The electroluminescent crossed-grid panel is formed on a glass substrate and is in a so-called crossed-grid structure in which the electroluminescent layer 2 is sandwiched between the horizontal electrodes $Y_1$ . . . $Y_n$ and vertical electrodes $X_1$ . . . $X_m$. Accordingly, the electroluminescent crossed-grid panel 1 has a multiplicity of electroluminescent elements $C_{ij}$ ($i$=1,2,3, . . . $m$; $j$=1,2,3, . . . $n$), called electroluminescent cells or picture elements. They are located at the intersections of $X_i$ and $Y_j$ electrodes. It is preferable, in order to provide for good characteristics of the electroluminescent crossed-grid panel, that a reflective layer (not shown) and non-linear impedance layer (not shown) also be sandwiched between the horizontal electrodes $Y_1$, . . . $Y_n$ and vertical electrodes $X_1$, . . . $X_m$.

The horizontal electrode driving circuit 10 comprises a counting circuit 11, a first trigger pulse distributor 12 connected to the output of the counting circuit, a second trigger pulse generator 13, and a set of pulse generators $PG_j$($j$=1,2,3,. . . $n$) which are connected to associated horizontal electrodes $PG_j$($j$=1,2,3,. . . $n$). The first trigger pulse distributor 12 has a plurality of outputs connected to the respective pulse generators $PG_1$, $PG_2$, . . . $PG_n$, while second trigger pulse generator has an output connected to all of the pulse generators $PG_1$, $PG_2 \ldots PG_n$ in parallel with the first trigger pulse distributor outputs.

The vertical electrode driving circuit 20 comprises a tapped delay line 21 connected to a set of brightness control circuits $B_i(i=1,2,3,\ldots m)$ which are connected to associated vertical electrodes $X_i(i=1,2,3,\ldots m)$.

In the present scanning apparatus, blanking pulses are used in order to suppress the cross effect, which if not supressed greatly decreases the contrast of images. By the set of pulse generators, the horizontal electrode to be scanned is supplied with a selecting pulse and at the same time the remaining horizontal electrodes are supplied with blanking pulses. The blanking pulses are in phase with the selecting pulse and have an amplitude of about one-third of the selecting pulse.

The selecting pulse is, of course, used in order to excite the electroluminescent elements along the horizontal electrode to be scanned at the same time. The selecting pulse generated by the pulse generator has a given amplitude which is modulated by the brightness control circuit so that each electroluminescent element along the selected horizontal electrode becomes luminous simultaneously in response to the video signal. The whole panel is thus scanned sequentially line-by-line in such a manner that amplitude-modulated pulses are applied at the same time to the electroluminescent elements along the horizontal electrode to be scanned at every horizontal period of the video signal.

A video signal generator 30 generates scanning-type video signals corresponding to patterns or pictures to be displayed; it can be replaced by an ordinary television receiver or a closed-circuit television camera. A horizontal synchronizing signal and a vertical synchronizing signal are separated from the video signal by the synchronizing signal separator 33 which is connected to the video signal generator 30, and which comprises conventional parts such as a multivibrator.

The horizontal synchronizing signal output of the synchronizing signal separator 33 is connected to both the counting circuit 11 and the second trigger pulse generator 13 while the vertical synchronizing signal output is connected only to the counting circuit 11. The counting circuit 11 is used to select the horizontal electrode to be scanned; the count advances one by one for each horizontal synchronizing signal, and is reset by the vertical synchronizing signal. At each count of the counter circuit, the first trigger pulse distributor 12 delivers a first trigger pulse in predetermined sequence to the pulse generator PG connected to the horizontal electrode to be scanned. The counter circuit 11 and the first trigger pulse distributor 12 can be replaced with a shift register in the form of an integrated circuit. At the same time, the second trigger pulse generator 13 delivers a second trigger pulse to all of the pulse generators PG each time a horizontal synchronizing signal arrives.

The selected pulse generator which receives both the first trigger pulse and the second trigger pulse supplies a selecting pulse to the selected horizontal electrode. The other pulse generators which receive only the second trigger pulse supply blanking pulses to the remaining horizontal electrodes at the same time, respectively. The selecting pulse has a given amplitude of about 300 volts and a negative polarity. A pulse generator which can be used for this purpose is disclosed in our U.S. Pat. No. 3,519,880, filed Nov. 29, 1967. An analysis of the suppression of the cross effect by the use of blanking pulses is also described in the above application.

In order to scan the electroluminescent crossed-grid panel 1, the electrical load of the pulse generator PG is mainly due to capacitance of the electroluminescent elements. Charging current at the time when a selecting pulse is applied to the electroluminescent elements increases with an increase in the picture area of the electroluminescent crossed-grid panel 1. Therefore, this requires a higher power for the pulse generator PG. In the horizontal electrode driving circuit used in the present scanning apparatus, the pulse generator need not have this high power. The requirement is avoided by connecting an inductor 14 in series and a capacitor 15 in parallel with each of the above pulse generators as shown in FIG. 2.

Figures 2, 3, 4, 5, 6:
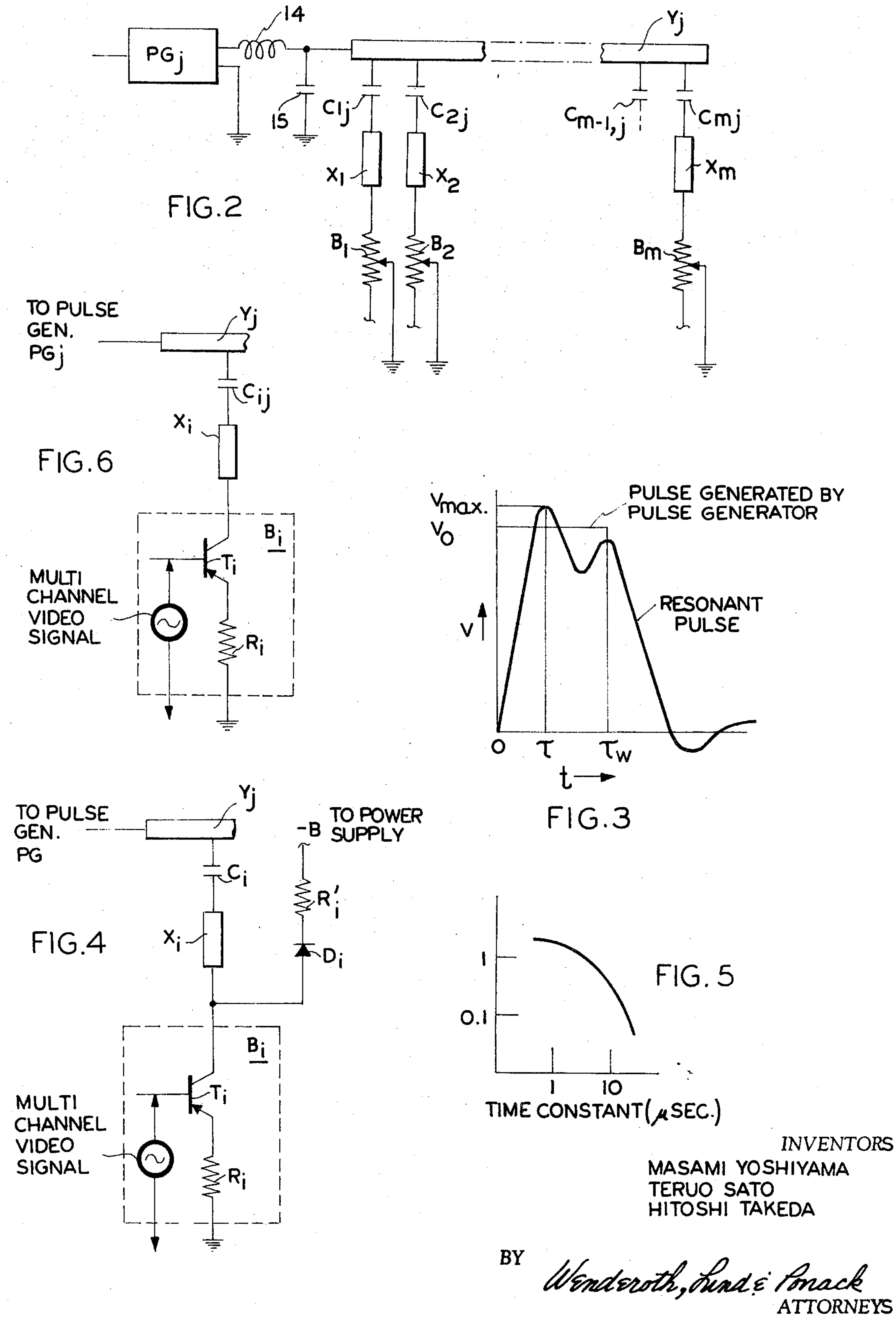
FIG. 2 is a simplified circuit diagram of an improved horizontal electrode driving circuit.
FIG. 3 is schematic representation of the wave form of a pulse generated by a pulse generator and its resonant pulse.
FIG. 4 is a simplified diagram of a brightness control circuit for aiding in the explanation of its operation.
FIG. 5 is a graph of experimental data concerning brightness control of the electroluminescent elements by means of the brightness control circuit shown in FIG. 4.
FIG. 6 is a simplified diagram of another brightness control circuit.

In FIG. 2, for simplicity, only a selected horizontal electrode $Y_j$, an associated pulse generator $PG_j$ and associated electroluminescent elements $C_{ij}(i=1,2,\ldots m)$ are shown. Similary, brightness control circuits $B_i(i=1,2,\ldots m)$ are replaced by variable resistors. The inductor 14 not only serves to limit the maximum charging current, but also, together with the capacitor 15, serves to increase the brightness of the electroluminescent elements by causing the applied selecting pulse to be resonant with the circuit.

Suppose that a pulse having an amplitude of $V_o$ is supplied by the pulse generator $PG_j$. In this case, the maximum amplitude $V_{max}$ of the pulse applied to the horizontal electrode $Y_j$ may be given by $$V_{max}=V_0\{1+\exp(-\pi\sqrt{4L/R^2C-1})\} \qquad (1)$$

where L the inductance (Henrys) of the inductor 14, C the resultant capacitance (Farads) of the electroluminescent elements $C_{1j}$—$C_{2j}$ $C_3$; . . . and the added capacitor 15, and R is the resultant resistance (Ohms) of the circuit including the internal resistance of the pulse generator $PG_j$.

The transient time $\tau$ that elapses up to the maximum value, as shown in FIG. 3, may be calculated as follows;

$$\tau=\pi\sqrt{\frac{1}{LC}-\left(\frac{R}{2L}\right)^2}=\frac{1}{2f} \qquad (2)$$

where f is the natural frequency of the circuit.

FIG. 3 shows schematic wave forms of the pulse generated by the pulse generator $PG_j$ and its resonant pulse applied to the horizontal electrode $Y_j$. It will be understood from FIG. 3 that the value of $\tau$ needs to be shorter than the pulse width $\tau_w$. Furthermore, when the rise time of the pulse is taken into account, the transient time must preferably be a value more than three times as large as the rise time of the pulse.

In the present scanning apparatus, the resultant capacitance C of the electroluminescent elements, viewed from each pulse generator, varies with the video signal to be displayed, but its variation is reduced by the added capacitor 15. As a result, uneven brightness caused by variation in the waveform of the resonant pulse cannot be seen on the reproduced image.

In the vertical electrode driving circuit in FIG. 1, the video signal, amplified and subjected to gamma correction by a video amplifier 31 connected between the video signal generator 30 and the delay line 21, is applied to the input terminal of the tapped delay line 21. The video signal corresponding to one horizontal scanning line of the video signal is converted into multi-channel video signals by the tapped delay line 21 and by the brightness control circuits Bi.

When the total delay time of the tapped delay line 21 is set to correspond to an effective horizontal period of the video signal, for example 63.5 microseconds minus the horizontal blanking period for a standard television signal, it is possible to delay a signal corresponding to one horizontal scanning line of the video signal throughout the whole length of the tapped delay line 21.

When the above signal has just been delayed over the tapped delay line 21, the brightness control circuits Bi sample the signal voltages simultaneously from all taps of the tapped delay line 21 by a sample signal, and hold them until a reset signal is supplied about 40 microseconds later than the sample signal.

The tapped delay line 21 is, for example, a conventional electromagnetic delay line such as constant *k*-type LC network and is equipped with taps at equal intervals connected with the associated vertical electrodes. One can use, as the tapped delay line, another type of delay line such as an acoustic delay line. The tapped delay line 21 together with the brightness control circuits Bi may be redesigned into an integrated circuit.

A sample-reset signal generator, composed mainly of multivibrators, is connected between the horizontal synchronous signal output of the synchronous signal separator 33 and the brightness control circuit Bi generates a sample signal and a reset signal in response to the horizontal synchronizing signal, and delivers it to all brightness control circuits at the same time.

Referring to FIG. 4, a selected horizontal electrode is denoted by $Y_j$, and a vertical electrode by Xi. The electroluminescent element formed at the intersection of electrodes Xi and $Y_j$ is denoted as a capacitor $C_{ij}$. The brightness control circuit, denoted as Bi, has a resistor $R_i$ and transistor Ti which is connected in series through the vertical electrode Xi to the electroluminescent element $C_{ij}$. The transistor Ti acts as a variable resistor, the resistance value of which is controlled by multi-channel video signal supplied to the base thereof. The multi-channel video signal is prepared as follows. The brightness control input circuit samples a video signal voltage from an associated tap of the tapped video delay line 21 by a sampling signal and holds it at a holding capacitor (not shown). The sampled video signal voltage is amplified by a DC amplifier (not shown) and then applied to a base of the transistor Ti as the multi-channel video signal.

When a negative selecting pulse is applied to a series combination of the electroluminescent element $C_{ij}$, the transistor Ti, and a resistor Ri, the time constant of charging current to the electroluminescent element $C_{ij}$ varies with transistor resistance between the emitter and the collector, and therefore the voltage across the electroluminescent element $C_{ij}$ varies with the time constant. As a result, the brightness of the electroluminescent element $C_{ij}$ is controlled by the multi-channel video signal. When the transistor resistance is a minimum, for example, available maximum voltage appears across the electroluminescent element $C_{ij}$ and full brightness is obtained. The resistor Ri is used to match the transistor resistance to the impedance of the electroluminescent element $C_{ij}$. A negative potential is supplied to the collector of the transistor Ti through a resistor Ri′ and a diode Di. This ensures normal operation of the transistor Ti regardless of the presence of the selecting pulse. The resistor Ri′ is not always necessary. The necessity of the diode Di will be understood from a consideration of the case when the multi-channel video signal is zero and the transistor is in the cutoff state. In this case, the application of the selecting pulse causes the collector potential to be negative; the diode is back-biased so that the collector is cut off from the power supply. Therefore, the time constant of the charging current to the electroluminescent element $C_{ij}$ remains large and the electroluminescent element $C_{ij}$ is only slightly luminous. In other words, the diode is necessary in order that the time constant of the charging current is not affected by a bypassing current path during the duration of the selecting pulse.

Referring to FIG. 5, the brightness of the electroluminescent element varies with the time constant of the charging current when the electroluminescent element is excited by relatively narrow pulses such as less than 63.5 microsecond, for example in this case 10 microseconds width at 15.75 KHz. Although the actual waveform of the light output in this case is very complicated, the brightness sensed by human vision sense depends on the integrated value of the light output. Therefore, the brightness can be controlled by varying the time constant of the charging current. According to the present brightness control circuit, the use of the video signal less than several volts can control the brightness extending over a range of more than two figures.

On the other hand, supply of the negative potential to the collector of the transistor Ti can be omitted as shown in FIG. 6, although in this case the collector is not biased for normal operating condition. The collector of the transistor Ti is nearly at ground potential, when the selecting pulse is not applied. Therefore, there is a disadvantage that input impedance viewed from the base of the transistor is a value as small as that of the resistor Ri. However, the transistor Ti is heated by collector current only for a limited time when the selecting pulse is applied. This means that the brightness can be controlled by a small-power transistor and by simplified configuration of the brightness control circuit.

While the present invention has been described with reference to reproducing an image such as television, it will be understood that many modifications may be made for other display application such as character or graphic display without actually departing from the present invention.

We claim

1. A scanning apparatus for an electroluminescent crossed-grid panel having a multiplicity of electroluminescent elements at the intersections of horizontal and vertical electrodes, said scanning apparatus comprising a horizontal electrode driving circuit adapted to be coupled to said horizontal electrodes and having a set of pulse generators for supplying a selecting pulse to a horizontal electrode to be scanned sequentially in response to a synchronizing signal of a video signal and for supplying the remaining horizontal electrodes at the same time with blanking pulses which are in phase with said selecting pulse and have an amplitude less than one-half of said selecting pulse, said horizontal electrode driving circuit further including a set of resonant circuits, each of which includes an inductor in series and a capacitor in parallel with a corresponding horizontal electrode and pulse generator, each said resonant circuit having a natural frequency determined by said pulse generator, said inductor, and said capacitor, one-half of the reciprocal of said natural frequency being less than the width of said selecting pulse and being more than three times as large as the rise time of said selecting pulse; a video signal supply means coupled to said horizontal electrode driving circuit for supplying the synchronizing signal of the video signal; a vertical electrode driving circuit consisting essentially of a set of brightness control circuits, each of which includes a transistor having the collector thereof adapted to be connected to a corresponding vertical electrode, and a circuit for supplying a multi-channel video signal connected to the base of each said transistor, and a delay means having a delay time corresponding to one horizontal period of the video signal and having taps connected to associated brightness control circuits, respectively; a sample reset signal generator coupled to said brightness control circuits and to said video signal supply means for supplying a sample signal and a reset signal to said brightness control circuits in response to synchronizing signals of a video signal; said video signal supply means being coupled to said vertical electrode driving circuit for supplying an amplified video signal to the input terminal of said delay means; whereby each of said electroluminescent elements along the horizontal electrode to be scanned is simultaneously controlled with respect to the brightness thereof by varying the collector resistance of each of said transistors in response to the multi-channel video signals which are sampled at each tap of said delay means at the same time.

2. A scanning apparatus as claimed in claim 1 further comprising a common power supply, and a diode, and wherein said collector of each of said transistors is coupled to said common power supply through said diode.

3. A scanning apparatus as claimed in claim 1 further comprising a common power supply, and a series combination of a diode and a resistor, and wherein said collector of each of said transistors is coupled to said common power supply through said series combination of a diode and a resistor.

* * * * *